Patented May 23, 1933

1,910,351

UNITED STATES PATENT OFFICE

JOSEPH A. MORRELL, OF NEW BRUNSWICK, NEW JERSEY, ASSIGNOR TO E. R. SQUIBB & SONS, OF NEW YORK, N. Y., A CORPORATION OF NEW YORK

PROCESS OF PRODUCING FEMALE SEX HORMONES

No Drawing.   Application filed March 3, 1927. Serial No. 172,570.

This invention relates to a process for the production of female sex hormones from the tissues of the female animals, such as liver, kidney, pancreas, spleen, muscle, blood, placenta, uterus and ovaries.

Heretofore, hormones have been obtained from the reproductive organs and associated parts of female animals, which hormones have not been soluble in water and not easily sterilized, and for that reason were not satisfactory for use to be administered subcutaneously by hypodermic injections for therapeutic purposes.

I have found that hormones that are capable of stimulating the activity of the reproductive organs of female animals are present in many portions of the body of female animals, and can be recovered therefrom in a form that is soluble in water.

In carrying out the invention, I subject tissues of female animals to an alkaline hydrolysis, using such alkalies as barium hydroxide, calcium hydroxide, potassium hydroxide, sodium hydroxide and ammonium hydroxide until inactive substances are broken down or disintegrated. The tissues are preferably comminuted or ground so as to be somewhat finely divided and heated to the boiling point with alkalies for about thirty minutes to an hour. The mass is then filtered, and acid, such as hydrochloric or sulphuric, is added to the filtrate until the hydrogen ion concentration reaches a value of about pH 7.0. The filtrate is concentrated by application of heat and vacuum until dryness is reached. The residue contains salts of the alkali which must be removed. This can be done by washing the residue by means of an organic solvent, after which the product is filtered and the filtrate is reconcentrated by distilling off the solvent in vacuo. The residue is a dark brown solid that is soluble in water and is stable.

In addition to the fact that the product is water soluble and can be easily sterilized by berkfelding, it is stable. It contains carbon, hydrogen, oxygen, nitrogen, phosphorus and sulphur, and will retain its potency for at least fifty days at a temperature of 125° F. It is non-toxic even when administered in doses many times the size of a therapeutic dose.

The product so obtained has the following physiological properties when injected hypodermically: It regulates or produces the sexual cycle in young female spayed animals; it hastens sexual maturity; it increases the basal metabolic rate in spayed animals; it increases voluntary activity of spayed female animals; it promotes development of secondary sexual characteristics; it stimulates the growth of the mammary glands in both spayed male and female animals, and it contains no blood pressure-reducing principles.

The following is given as a specific example of carrying out the process and obtaining the product, but it is to be understood that the invention is not restricted to the particular raw material that is specified, nor to the particular alkali, and it can be varied within somewhat wide limits without departing from the spirit or scope of the invention:

Fresh blood from a female animal is boiled for about sixty minutes in the presence of about five volumes of normal barium hydroxide solution. The mixture is then rapidly cooled and filtered to remove the broken down inactive substances and tissue. Hydrochloric or sulphuric acid is added to the filtrate until it is neutral, and it is then distilled to dryness under a vacuum of about one-tenth of an inch of mercury. The barium salt is removed from the residue by dissolving the active principles in alcohol and filtering. The filtrate or alcoholic solution containing the active principles is reconcentrated by distilling under a vacuum of about one-tenth of an inch of mercury until a dry residue is left. This dry residue is then dissolved in water and it is sterilized by berkfelding.

It is to be understood that the process above described is applicable to the treatment of female sex hormones heretofore prepared from reproductive tissue, at any stage of their preparation by hitherto described methods. As a result of such treatment, the final product will be in a water soluble form and will be physiologically active. For example, instead of treating the tissues of female animals as above described, I may take an organic solvent extract of the female tissue and treat it in the same manner to obtain the hormones. Or, I may take the organic solvent extract of female tissue from which cholesterol and phospholipins have been removed by extraction with alcohol, ether and acetone, and treat the extract in the same manner as above described.

I claim:

1. In the process of producing water soluble female sex hormones the step which comprises subjecting blood of female animals to alkaline hydrolysis without destroying its sexually active principles.

2. In the process of producing water soluble female sex hormones the steps which comprise subjecting blood of female animals to alkaline hydrolysis sufficient to break down inactive substances without destroying its sexually active principles and separating from the active principles the broken down substances.

3. In the process of producing water soluble female sex hormones the steps which comprise subjecting blood of female animals to alkaline hydrolysis sufficient to break down inactive substances without destroying its sexually active principles and adjusting to approximate neutrality by the addition of acid.

4. The process of producing water soluble female sex hormones which comprises subjecting blood of female animals to alkaline hydrolysis sufficient to break down inactive substances without destroying its sexually active principles, adjusting to approximate neutrality by the addition of acid, concentrating in vacuo to dryness and extracting the active principles with alcohol.

5. In the process of producing water soluble female sex hormones the step which comprises subjecting non-acid organic solvent extract of female blood to alkaline hydrolysis without destroying its sexually active principles.

6. In the process of producing water soluble female sex hormones the step which comprises subjecting non-acid organic solvent extract of female blood from which chloesterol and phospolipins have been removed to alkaline hydrolysis without destroying its sexually active principles.

JOSEPH A. MORRELL.